United States Patent [19]

Chin-Hun

[11] Patent Number: 5,096,242
[45] Date of Patent: Mar. 17, 1992

[54] SHOCK-ABSORBING BUMPER SYSTEM

[76] Inventor: Yang Chin-Hun, 2nd Fl., No. 49, Lane 30, Sec. 4, Chengkung Rd., Taipei, Taiwan

[21] Appl. No.: 714,377

[22] Filed: Jun. 10, 1991

Related U.S. Application Data

[63] Continuation-in-part of Ser. No. 574,105, Aug. 29, 1990, abandoned.

[51] Int. Cl.⁵ .............................................. B60R 19/40
[52] U.S. Cl. ....................................... 293/5; 293/118; 293/134
[58] Field of Search ................ 293/5, 30, 104, 118, 293/134; 267/64.15

[56] References Cited

U.S. PATENT DOCUMENTS

| | | | |
|---|---|---|---|
| 3,210,063 | 10/1965 | Kirsch | 267/64.15 X |
| 3,346,292 | 10/1967 | Lundman | 293/118 X |
| 3,355,208 | 11/1967 | Brock | 293/118 X |
| 3,947,061 | 3/1976 | Ellis | 293/5 |
| 4,474,257 | 10/1984 | Lee | 293/118 X |
| 4,518,183 | 5/1985 | Lee | 293/134 X |
| 4,932,697 | 6/1990 | Hun | 293/5 |
| 5,011,205 | 4/1991 | Liu | 293/5 |

FOREIGN PATENT DOCUMENTS 95950 4/1990 Japan .................... 293/134

Primary Examiner—Margaret A. Focarino
Assistant Examiner—Gary C. Hoge
Attorney, Agent, or Firm—Bacon & Thomas

[57] ABSTRACT

A shock-absorbing bumper system for an automotive vehicle includes a conduit subsystem for conducting hydraulic fluid therein, a supply subsystem for supplying hydraulic fluid, a pressure-balancing subsystem for regulating the pressure of hydraulic fluid, front and rear bumper subsystems for respectively extending and retracting front and rear bumpers and for absorbing shock, a switching subsystem for directing hydraulic fluid, and a feedback subsystem for absorbing shock.

23 Claims, 14 Drawing Sheets

SHOCK-ABSORBING BUMPER SYSTEM

This is a continuation-in-part application of U.S. patent application Ser. No. 07/574,105 filed on Aug. 29, 1990, which is now abandoned.

BACKGROUND OF THE INVENTION

The present invention relates to a shock-absorbing bumper system for a vehicle, and more particularly to a brake-actuated shock-absorbing bumper system for absorbing external impacts due to a collision of the vehicle with another vehicle or object.

Conventional front and rear bumpers of vehicles are respectively and securely connected to front and rear ends of the vehicle body. Under such circumstances, if the vehicle collides with another vehicle or other objects, a powerful shock is transferred to the body along the bumper, resulting in severe damage to or destruction of the vehicle. Sometimes the shock is even transferred to passengers if the vehicle is subjected to tremendous impact, resulting in injury or death of the passengers. Applicant's U.S. Pat. No. 4,932,697 proposed a brake-actuated automatic extending bumper for absorbing shock. The present invention provides an alternative and further advanced shock-absorbing bumper system to protect the vehicle and its passengers.

SUMMARY OF THE INVENTION

It is an object of the present invention to provide a shock-absorbing bumper system for vehicles, in which accumulators are provided to absorb shock or impact due to collision of the front or rear bumper or both with another vehicle or object.

It is another object of the present invention to provide a shock-absorbing bumper system in which the system operates with or without actuation of a brake pedal of the vehicle.

It is still another object of the present invention to provide a shock-absorbing bumper system in which the front and rear bumpers separate from the whole bumper system, preventing the vehicle and passengers therein from being respectively damaged and injured from a tremendous impact.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

It is firstly noted that the shock-absorbing bumper system according to the present invention is mounted to an underside of a chassis (not shown) of a vehicle, and the mounting means therefor will not be described as they are conventional and not relevant to the present invention.

Figure 1:
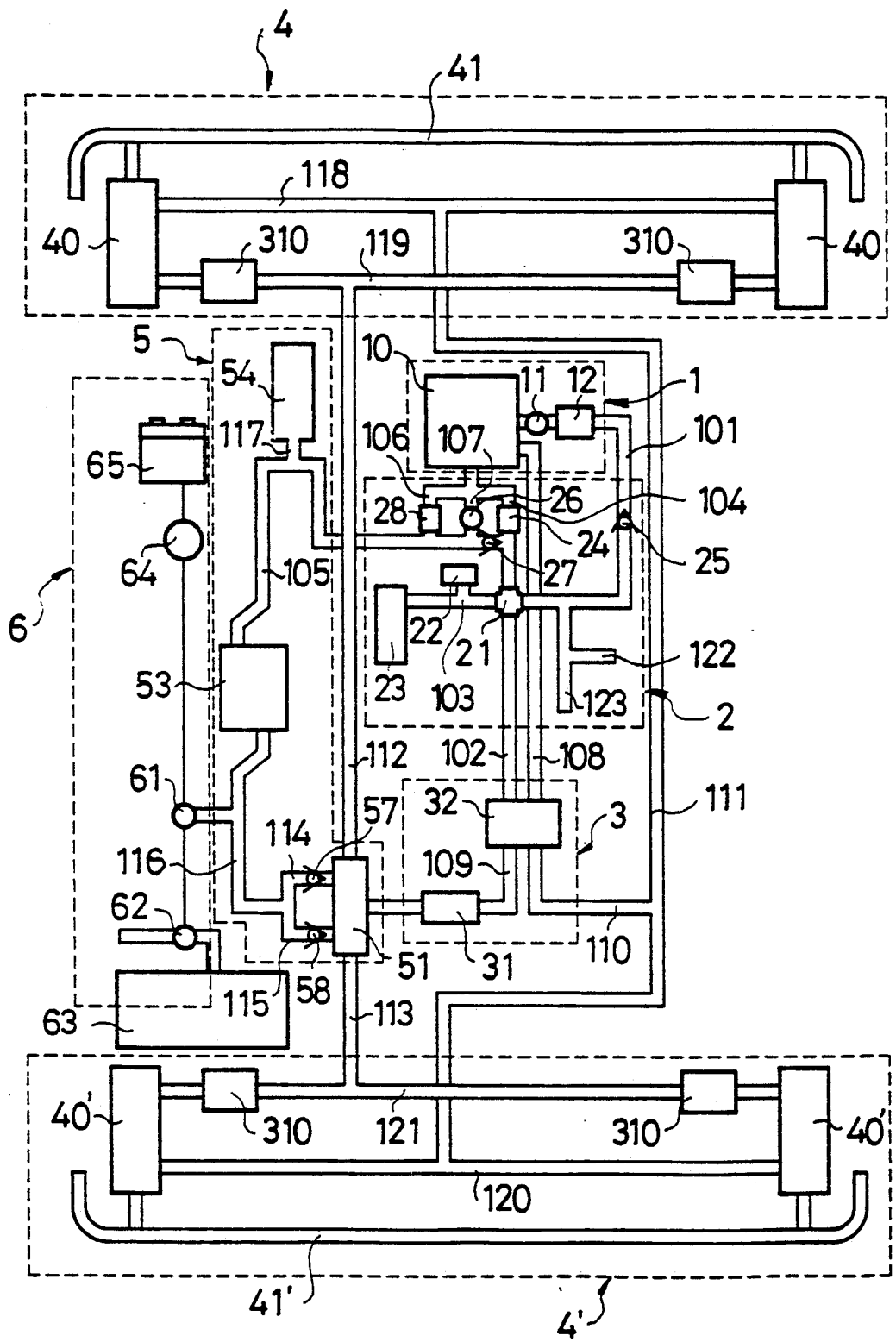
FIG. 1 is a schematic view of a shock-absorbing bumper system for vehicles in accordance with the present invention.

Referring to FIG. 1, a shock-absorbing bumper system according to the present invention includes a supply subsystem 1 for supplying pressurized working fluid, a pressure-balancing subsystem 2, a switching subsystem 3, front and rear bumper subsystems 4 and 4', a feedback subsystem 5, a safety-control subsystem 6, and a conduit system having a plurality of oil paths for connecting subsystems 1, 2, 3, 4, 4', 5, and 6.

The supply subsystem 1 includes a tank 10 for storage of working fluid, such as hydraulic oil. A first end of a first oil path 101 communicates with the tank 10 and a second end of the first oil path 101 communicates with a first end of a cross joint 21 of the pressure-balancing subsystem 2. An oil filter 11 is provided adjacent to the first end of the first oil path 101 for filtering working fluid flowing out from the tank 10. A pump 12, which is the power source of the working fluid, is provided adjacent to the tank 10. The pump 12 can be an electric gear pump or an engine pump.

In the pressure-balancing subsystem 2, a second end of the cross joint 21 communicates with a first end of a second oil path 102, which has a second end communicating with a first port 321 (cf. FIGS. 4A through 4C) of a solenoid valve 32 of the switching subsystem 3. A third end of the cross joint 21 communicates with a first end of a third oil path 103, which has a second end communicating with a low-pressure accumulator 23. A fourth end of the cross joint 21 communicates with a first end of a fourth oil path 104, which has a second end communicating with the tank 10. A relief valve 24 for low pressure is provided in the fourth oil path 104. A first end of a fifth oil path 105 communicates with the fourth oil path 104 at a point between the relief valve 24 and the fourth end of the cross joint 21. A second end of the fifth oil path 105 communicates with a first end of a buffer 53 of the feedback subsystem 5.

A sixth oil path 106 communicates with the fifth oil path 105 at a first end thereof, and a second end of the sixth oil path 106 communicates with the oil tank 10. Between the fourth and six oil paths 104 and 106, a seventh oil path 107 communicates with the fifth oil path 105 at a first end thereof, and a second end of the seventh oil path 107 communicates with the oil tank 10. In this embodiment, the fourth, sixth, and seventh oil paths 104, 106, and 107 meet at one point before they communicate with the oil tank 10. A relief valve 28 for high pressure is provided on the sixth oil path 106. An electric relief valve 26, which will be described in detail later, is provided on the seventh oil path 107. A check valve 27 is provided on the fifth oil path 105, between the seventh oil path 107 and the fourth oil path 104, for preventing working fluid of high pressure from flowing from the fifth oil path 105 into the fourth oil path 104. The low pressure relief valves 24 and 28 are conventional such that no further description is required. Another check valve 25 is provided on the first oil path 101 for preventing working fluid from flowing from the cross joint 21 into the tank 10. The structure and operation of check valves 25 and 27 are conventional and will not be further described.

Figure 2:
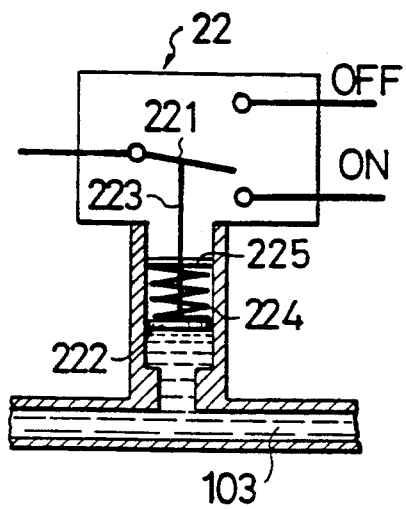
FIG. 2 is a schematic view of a hydraulic pressure sensing/controlling means in accordance with the present invention.

Referring to FIG. 1 and further to FIG. 2, a hydraulic pressure sensing/controlling means 22 is provided on the third oil path 103. The hydraulic pressure sensing/controlling means 22 comprises a contact blade 221, a piston head 222, a piston rod 223 connecting the piston head 222 and the contact blade 221, and two terminals (ON and OFF) which electrically connect with the pump 12. When the pressure of the working fluid is too low, the piston head 222 is lowered such that the contact blade 221 contacts the ON terminal, starting the pump 12 to supply working fluid while extending a spring 224 provided between the piston head 222 and a plate 225. When the pressure of the working fluid reaches a desired level, the piston head 222 moves upward due to contraction force of the spring 224, and the contact blade 221 contacts the OFF terminal, stopping the pump 12.

Figure 3:
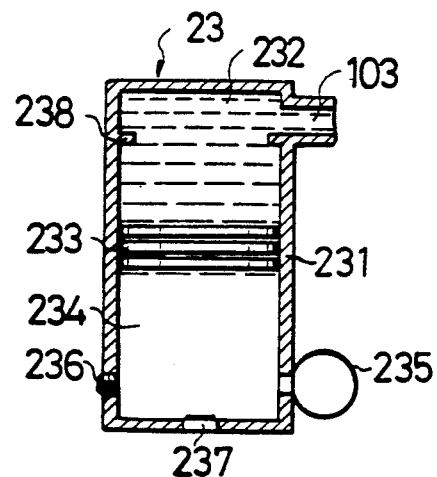
FIG. 3 is a schematic view of an accumulator in accordance with the present invention, in which the accumulator has absorbed an impact due to an occurred collision.

Referring to FIG. 3, the low-pressure accumulator 23 includes a cylinder 231 which communicates with the third oil path 103 at an upper portion thereof. A piston 233 is movably received in the cylinder 231, defining an upper chamber 232 and a lower chamber 234. The upper chamber 232 is filled with working fluid, and the lower chamber 234 is filled with gas, such as nitrogen. Seals are provided on the piston 233 such that the working fluid will not leak into the lower chamber 234. A pressure gauge 235 is provided for indicating magnitude of pressure inside the lower chamber 234. A pressure relief valve 236 is provided for automatically releasing pressure when the pressure inside the lower chamber 234 is too high. A nozzle 237 is provided on the lower chamber 234 for supplying gas into the lower chamber 234 when the pressure inside the lower chamber 234 is too low.

Figure 3A:
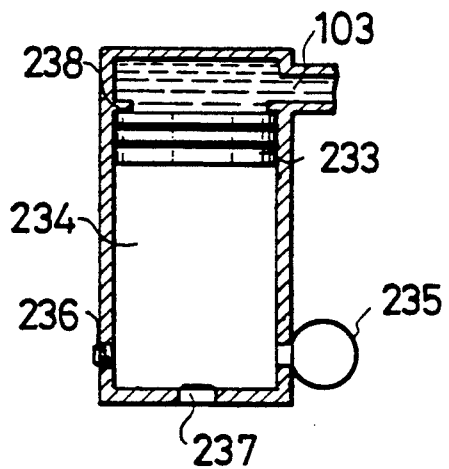
FIG. 3A is a schematic view of the accumulator in FIG. 3, in which the accumulator is in a status before a collision occurs.

A pair of stops 238 are provided on an upper portion of an inner periphery of the accumulator 23. The accumulator 23 is filled with nitrogen via the nozzle 237 to a status shown in FIG. 3A, in which the piston 231 reaches an uppermost position and is stopped by the stops 238, and the pressure in the lower chamber 234 equals a pre-set value, for example, 500 psi. If the pressure of the working fluid in the third oil path 103 is below 500 psi (no collision occurs), the piston 234 is not moved. If the pressure of working fluid in the third oil path 103 increases to be above 500 psi (a collision occurs), the piston 234 is moved downward (cf. FIG. 3) to absorb excessive pressure resulting from the impact due to the collision.

Figure 4A:
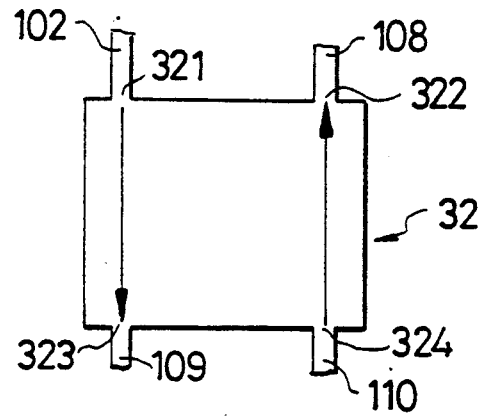
FIGS. 4A through 4C are schematic views showing fluid communication of a solenoid valve in accordance with the present invention.
Figure 4B:
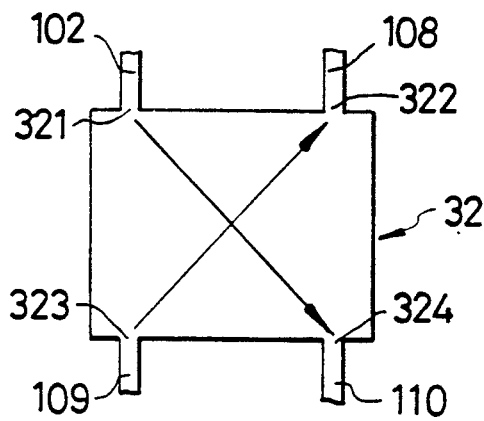
Figure 4C:
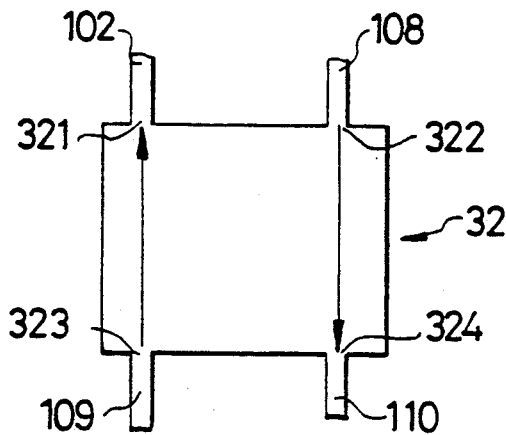

Still referring to FIG. 1, and further to FIGS. 4A through 4C, in the switching subsystem 3, as illustrated in the above, the first port 321 of the solenoid valve 32 communicates with the second oil path 102. A second port 322 of the solenoid valve 32 communicates with the tank 10 via an eighth oil path 108. A third port 323 of the solenoid valve 32 communicates with a first port 501 of a shuttle valve 51 via a ninth oil path 109. A fourth port 324 of the solenoid 32 communicates with an eleventh oil path 111 via a tenth oil path 110. The eleventh oil path 111 communicates with the front and rear bumper subsystems 4 and 4', which will be discussed in detail later. A limiting valve 31 is provided on the ninth oil path 109, limiting the pressure and amount of working fluid flowing from the shuttle valve 51 into the solenoid valve 32 when a collision occurs.

Figure 8:
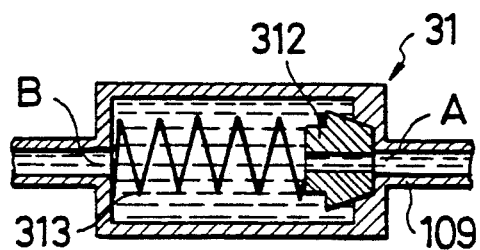
FIG. 8 is a schematic view showing a limiting valve utilized in the present invention.

Referring to FIG. 8, the limiting valve 31 utilized in the present invention includes two ports A and B, a restraining block 312 movably mounted in port A, and a spring 313 fixedly attached to the restraining block 312 at one end thereof and fixedly attached to port B. As can be seen in this figure, if working fluid flows from port A to port B, the restraining block 312 moves inward, while compressing the spring 313, such that the flow of working fluid is not limited in a substantial manner. If the working fluid flows from port B to port A, as can be seen in this figure, the restraining block 312 has an inner passage with an inner diameter smaller than that of port A. Accordingly, the flow of working fluid from port A to port B is limited. Nevertheless, such a limiting valve 31 is conventional so that the structure and function thereof will not be further described.

In a first mode of the solenoid valve 32, working fluid is flowable from the second oil path 102 to the ninth oil path 109, and from the tenth oil path 110 to the eighth oil path 108, as shown in FIG. 4A. In a second mode of the solenoid valve 32, working fluid is flowable from the ninth oil path 109 to the eighth oil path 108, and from the second oil path 102 to the tenth oil path 110, as shown in FIG. 4B. In a third mode of the solenoid valve 32, working fluid is flowable from the ninth oil path 109 to the second oil path 102, and from the eigth oil path 108 to the tenth oil path 110, as shown in FIG. 4C.

Figure 5:
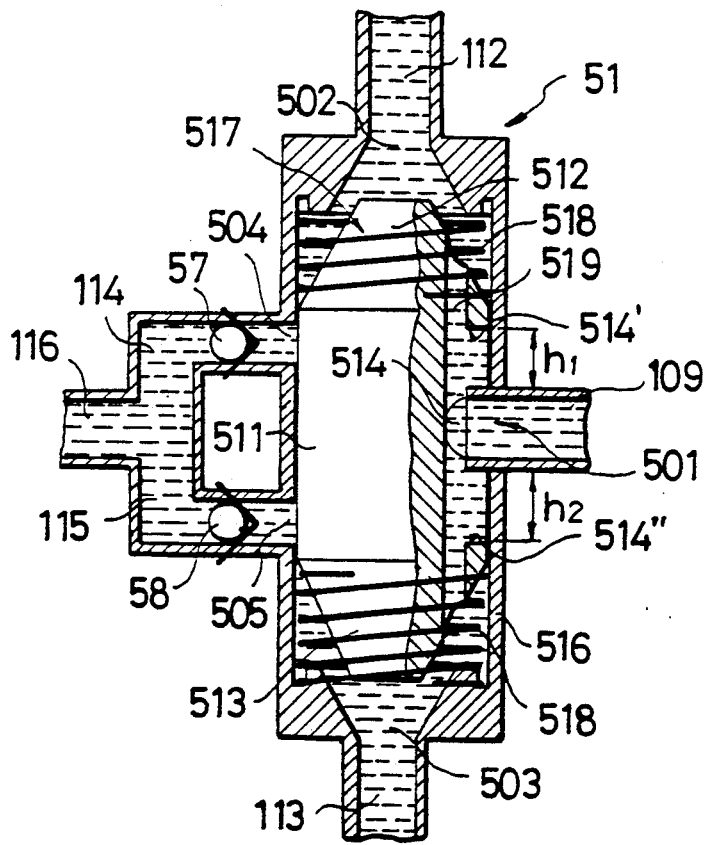
FIG. 5 is a schematic view of a shuttle valve.

Referring to FIG. 1 and further to FIG. 5, in the feedback subsystem 5, as illustrated above, the first port 501 of the shuttle valve 51 communicates with the third port 323 of the solenoid valve 32 via the ninth oil path 109. A second port 502 of the shuttle valve 51 communicates with a first end of a twelfth oil path 112, which communicates with the front bumper subsystem 4. A third port 503 of the shuttle valve 51 communicates with a thirteenth oil path 113, which communicates with the rear bumper subsystem 4'. In an original stable status of the shuttle valve 51, the first port 501 communicates with the second port 502 and the third port 503 via an inner oil path 519 in the shuttle 517. A fourth and a fifth port 504 and 505 of the shuttle valve 51 communicate with a first end of a fourteenth oil path 114 and a first end of a fifteenth oil path 115. A second end of the fourteenth oil path 114 meets a second end of a sixteenth oil path 116 at a first end of a fifteenth oil path 115. A second end of a sixteenth oil path 116 communicates with a second end of the buffer 53, whose first end communicates with the fifth oil path 105. A high-pressure accumulator 54 communicates with the fifth oil path 105 via a seventeenth oil path 117.

Figure 9:
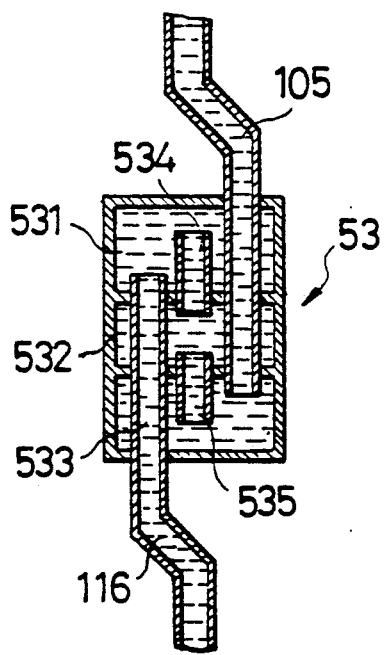
FIG. 9 is a schematic view showing a buffer utilized in the present invention.

Referring to FIG. 9, the fifth oil path 105 protrudes into the buffer 53 via the first end of the buffer 53, and the sixteenth oil path 116 protrudes into the buffer 53 via the second end of the buffer 53. As can be seen in this figure, the buffer 53 is divided into three chambers 531, 532, and 533. If working fluid comes from the fifth oil path 105, it must pass through chamber 533, two intermediate pipes 535 and 534, the chamber 531, and then to the sixteenth oil path 116. If working fluid comes from the sixteenth oil path 116, it flows in a reverse direction to that mentioned above. It is clear that the path is curved such that working fluid, after passing through the buffer 53, and the shock waves thereof are absorbed by the buffer 53. The buffer 53 is used to absorb shock waves entering the sixteenth oil path 116 via the shuttle valve 51, protecting the high-pressure accumulator 54 and allowing a smooth operation of the high-pressure accumulator 54 during absorption of the high pressure of working fluid created by an impact on the front or rear bumpers. Since the structure and function of the buffer 53 is conventional, no further detailed description is required.

Referring back to FIG. 3, the structure of the high-pressure accumulator 54 is the same as that of the low-pressure accumulator 23. The only difference between the two accumulators 54 and 23 is that accumulator 54 is used in high pressure circumstances and accumulator 23 is used in low pressure circumstances. For example, the pressure in the lower chamber of the high-pressure accumulator 54 is set at 1500 psi, while the pressure in the lower chamber of the low-pressure accumulator 23 is set at 500 psi, as described above.

Still referring to FIG. 1, in the safety-control subsystem 6, a sensing/controlling switch 61 is mounted on the sixteenth oil path 116. The sensing/controlling switch 61 electrically connects with a switching valve 62 which controls the opening and closing of a fuel tank 63 of the vehicle. The sensing/controlling switch 61 also electrically connects with a magnetic valve 64, which electrically connects with a battery 65 of the vehicle. As soon as the pressure of the sixteenth oil path 116 exceeds a predetermined value, i.e., the vehicle collides with another vehicle or object, the sensing/controlling switch 61 senses the excessive pressure and urges the magnetic valve 64 to turn off the electrical connection of the battery 65, and urges the switching valve 62 to switch off the fuel supply from the fuel tank 63. Accordingly, leakage of fuel and generation of sparks are avoided, preventing the vehicle from exploding or igniting in an accident. It is noted that the provision of the safety-control subsystem 6 is optional. Nevertheless, provision of the safety-control subsystem 6 provides protection for the passengers.

Figure 6:
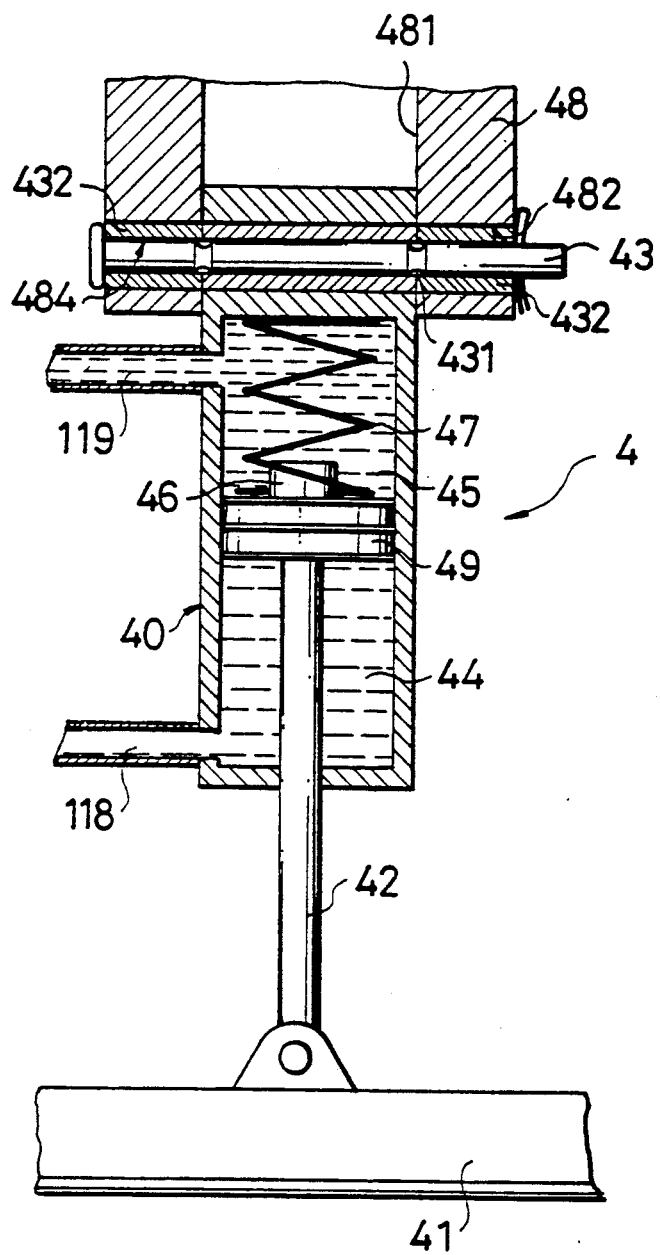
FIG. 6 is a schematic view of a front bumper subsystem of the shock-absorbing bumper system in accordance with the present invention.

Referring to FIGS. 1 and 6, the front bumper subsystem 4 comprises a front bumper 41 and two spaced first cylinders 40 provided behind two corners of the front bumper 41. Each of the cylinders 40 has a piston 49 therein defining a first chamber 44 and a second chamber 45. The piston 49 is rigidly connected to the front bumper 41 via a piston rod 42 at a first side thereof. An eighteenth oil path 118 communicates with a front portion of each of the spaced cylinders 40. A nineteenth oil path 119 communicates with a rear portion of each of the spaced cylinders 40. A second end of the twelfth oil path 112 communicates with the nineteenth oil path 119, and the first end of the twelfth oil path 112 communicates with the second port 502 of the shuttle valve 51, as illustrated above. Provided within each end of the nineteenth oil path 119 is a limiting valve 310. Structure and function of the limiting valve 310 are the same as those of the limiting valve 31, and thus will not be further described.

Similarly, the rear bumper subsystem 4' comprises a rear bumper 41' and two spaced second cylinders 40' provided behind (as seen from the rear side of the vehicle) the rear bumper 41'. The structure of the second cylinders 40' are the same as that of the first cylinders 40 in FIG. 6; no further description is required. The twentieth oil path 120 communicates with a front portion of each of the spaced second cylinders 40'. A twenty-first oil path 121 communicates with a rear portion of each of the spaced second cylinders 40'. A second end of the thirteenth oil path 113 communicates with the twenty-first oil path 121, and the first end of the thirteenth oil path 113 communicates with the third port 503 of the shuttle valve 51, as illustrated above. The twentieth oil path 120 communicates with the eighteenth oil path 118 via the eleventh oil path 111. As illustrated above, the fourth port 324 of the solenoid 32 communicates with the eleventh oil path 111 via the tenth oil path 110.

Alternatively, the piston 49 may have a protrusion 46 provided on a second side thereof, with a spring 47 mounted on the protrusion 46 between the piston 49 and a bottom wall of the cylinder 40. In addition, a sleeve 48, having a receiving space 481, may be provided at the rear end of the cylinder 40. As shown in FIG. 6, the bottom wall of the cylinder 40 extends into the receiving space 481. A hole 482 penetrates through the bottom wall of the cylinder 40 and the sleeve 48, and a rigid lining 432 extends longitudinally in the hole 482. In addition, a longitudinal pin hole 484 is formed in the rigid lining 432. A shear pin 43 extends longitudinally in the pin hole 484. The shear pin 43 has two spaced recessed portions 431.

When the bumper 41 is subjected to an impact, working fluid within the second chamber 45 absorbs the impact, providing a first protection. The spring 47 absorbs any remaining impact, providing a second protection. Nevertheless, if the impact is too tremendous, the protrusion 46 impacts on the bottom wall of the cylinder 40, and the shear pin 43 breaks at the recessed portions 431 thereof due to shearing force from the rigid lining 432, allowing the cylinder 40 to enter the receiving space 481. Accordingly, the tremendous impact is not able to be transferred to the passengers via the chassis, thereby protecting the passengers as well as the chassis.

Figure 6A:
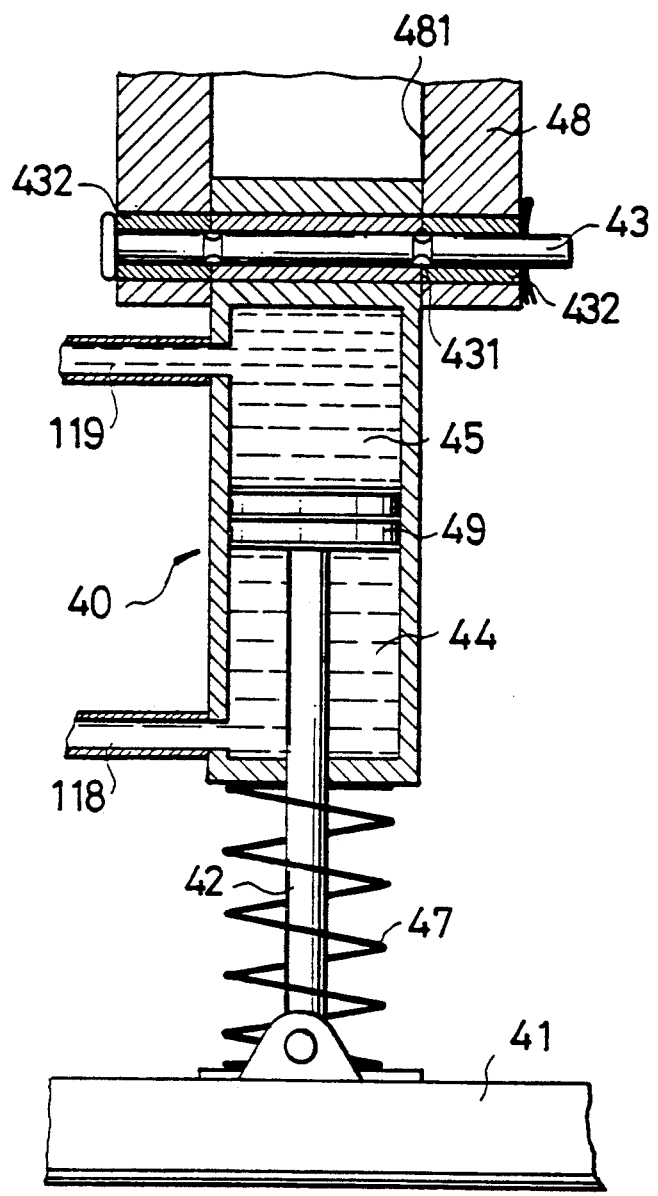
FIG. 6A is a schematic view showing an alternative design of the front pumper subsystem of FIG. 6.

FIG. 6A shows an alternative design of the front bumper subsystem 4. As can be seen in this figure, the spring 47 is provided between a front end of the cylinder 40 and a bottom side of the bumper 41 (this configuration not affecting the function of the spring 47). In FIGS. 6 and 6A, the spring 47, in addition to absorbing impact, returns the piston 49 to a neutral position as shown in these two figures.

Figure 5A:
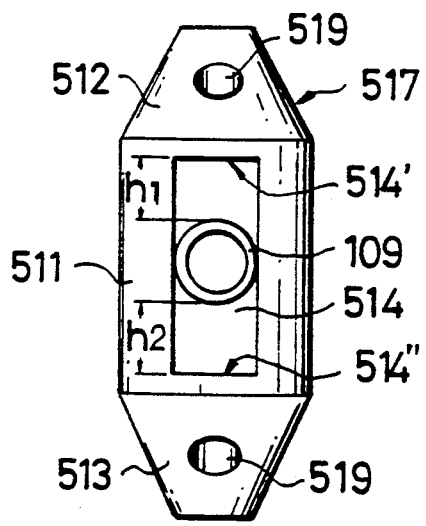
FIG. 5A is a side view of a shuttle of the shuttle valve in FIG. 5.

Referring now to FIG. 5, the shuttle valve 51 comprises a shuttle 517 which controls fluid communication of the ports 501, 502, 503, 504, and 505 thereof. The shuttle 517 is substantially a cylindrical body 511 with a first and a second conic end 512 and 513. Each of the conic ends 512 and 513 are biasable by a spring 518. An inner passage 519 is formed in the shuttle 517, parallel to a longitudinal axis of the shuttle 517, communicating with the ninth oil path 109 via the first port 501 of the shuttle 517. In addition, as shown in FIG. 5A, a slot 514 is formed, parallel to the longitudinal axis of the shuttle 517, on an outer periphery of the cylindrical body 511. As shown in FIG. 5, the ninth oil path 109 is in threaded connection with an outer wall of the shuttle valve 516, with an end portion of the ninth oil path 109 projecting into the cylindrical body 511 of the shuttle 517, such that the shuttle 517 is only longitudinally movable in the shuttle valve 51 along a longitudinal axis of the slot 504, and rotational movement of the shuttle 517 is not permitted. Preferably, the fourteenth and fifteenth oil paths 114 and 115 are of the same inner diameter, for example, 5.0 cm. The ninth oil path 109 has an inner diameter greater than that of the fourteenth oil path 504, for example, 7.0 cm. And the slot 514 has a length such that a distance h1 between a first edge 514' of the slot 514 and the ninth oil path 109 is greater than the inner diameter of the fourteenth oil path 114 (i.e., 5.0 cm), for example, 7.0 cm. Similarly, the distance h2 between a second edge 514" of the slot 514 and the ninth oil path 109 is greater than the inner diameter of the fifteenth oil path 115 (i.e., 5.0 cm), for example, 7.0 cm.

Still referring to FIG. 5, in a first mode of the shuttle valve 51, i.e., in an unstressed position, the first port 501, the second port 502, and the third port 503 communicate with one another. When working fluid flows from the ninth oil path 109 into the shuttle valve 51 via the first port 501 thereof, the shuttle 517 is not moved, and working fluid branches into the twelfth and thirteenth oil paths 112 and 113. When working fluid flows from the twelfth oil path 112 into the shuttle valve 51 via the second port 502 thereof, the shuttle 517 moves downward such that the third and fifth ports 503 and 505 are blocked and the fourth port 501 is opened. The first port 501 is still fully opened if it is a small impact, but is partially closed if it is a tremendous impact. Accordingly, working fluid from the second port 502 branches to the sixteenth oil path 116 (via the fourth port 504 and the fourteenth oil path 114) and the ninth oil path 109. The shuttle 517 is returned by the springs 518 to its original position after the impact due to a collision is absorbed. Most of the working fluid flows to the sixteenth oil path 116 and the remaining working fluid flows to the ninth oil path 109 (due to provision of the limiting valve 31).

Similarly, when working fluid flows from the thirteenth oil path 113 into the shuttle valve 51 via the third port 503 thereof, the shuttle 517 moves upward such that the second and fourth ports 502 and 504 are blocked and the fifth port 505 is opened. The first port 501 is still fully opened if it is a small impact, but is partially closed if it is a tremendous impact. Accordingly, working fluid from the third port 503 branches to the sixteenth oil path 116 (via the fifth port 505 and the fifteenth oil path 115) and the ninth oil path 109 (via the first port 501). Again, most of the working fluid flows to the sixteenth oil path 116 and the remaining working fluid flows to the ninth oil path 109 (due to provision of the limiting valve 31).

A check valve 57 is provided on the fourteenth oil path 114, and another check valve 58 is provided on the fifteenth oil path 115, such that it is impossible for working fluid to flow into the shuttle valve 51 via the fourth or fifth ports 504 and 505, i.e., working fluid is only flowable from the fourth or fifth port 504 or 505 to the sixteenth oil path 116.

Figure 7:
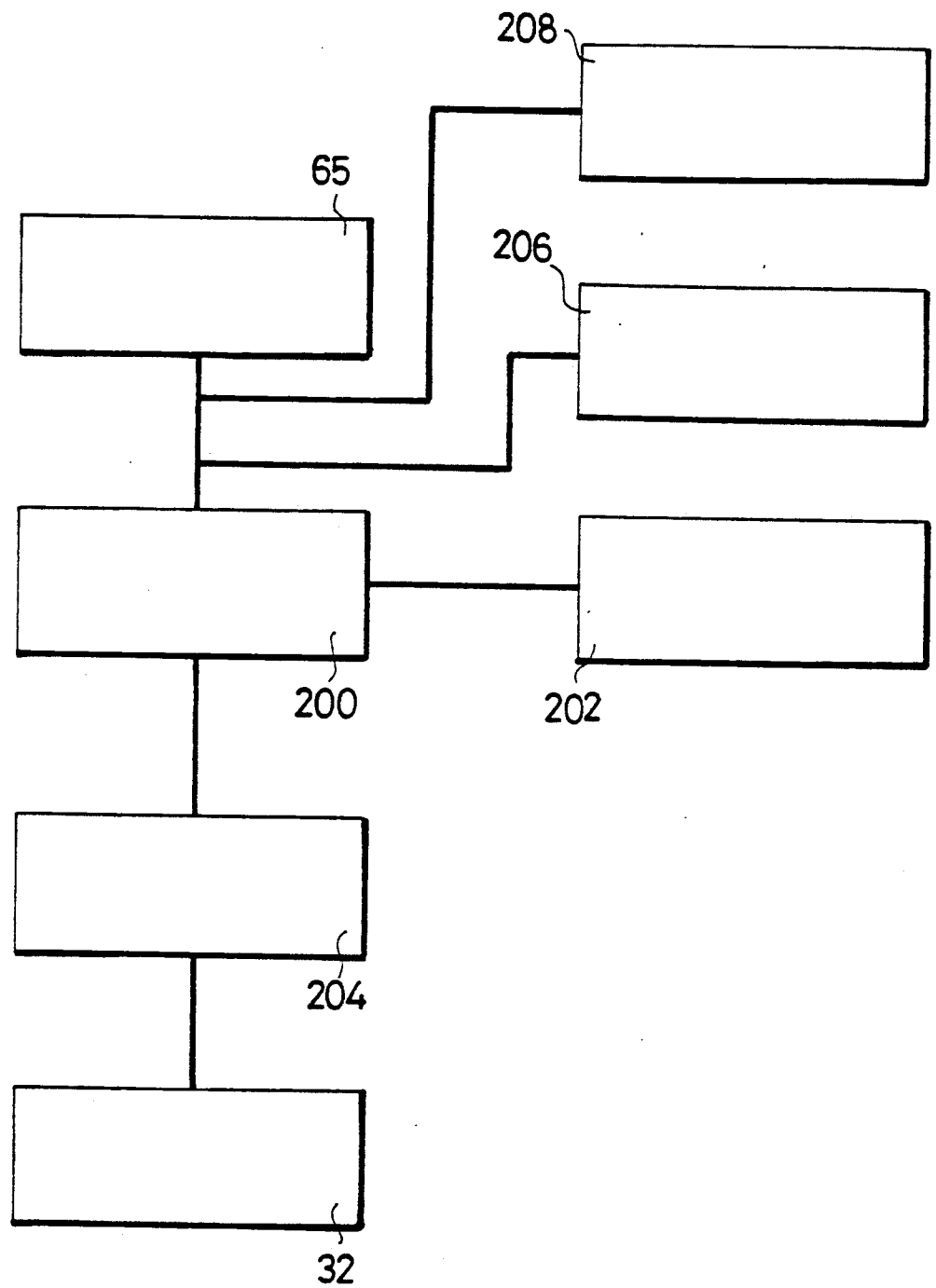
FIG. 7 is a schematic view showing connection of the solenoid valve of FIGS. 4A through 4C and the brake pedal of the vehicle.

FIG. 7 is a schematic view showing the control of the solenoid valve 32 via a brake pedal 202 of the vehicle. As can be seen in this figure, a microswitch 200, which is electrically connected to the battery 65 of the vehicle, is mounted on the brake pedal 202. The microswitch 200 also is electrically connected to a relay 204, which is connected to the solenoid valve 32. When the brake pedal 202 is depressed before the bumpers are hit, the microswitch 200 is activated by the battery 65 to control the relay 204, thereby switching the solenoid valve 32 to its first mode shown in FIG. 4A. When the bumpers are hit, as illustrated in the above, with source from the battery 65 being cut off by the magnetic valve 64, the microswitch 200 is activated to control the relay 204, thereby switching the solenoid valve 32 to its third mode shown in FIG. 4C.

To the contrary, if the bumpers are not hit, i.e., no collision occurs, the brake pedal 202 is released, and the microswitch 200 is activated to control the relay 204, thereby switching the solenoid valve 32 to its second mode shown in FIG. 4B. Optionally, a circuit breaker 206 can be provided between the battery 65 and the microswitch 200, preventing damage to this circuit results from overload. Also optionally, a manual control switch 208 can be provided between the battery 65 and the microswitch 200. If the manual control switch 208 is turn on, the solenoid valve 32 operates responsive to a depression of the brake pedal 202 in the above-mentioned manner. To the contrary, if the manual control switch 208 is turn off, electrical connection between the battery 65 and the solenoid valve 32 is disconnected, and the solenoid valve 32 does not operate responsive to a depression of the brake pedal 202. Arrangement of the manual control switch 208 is useful in downtown areas where the speed of the vehicle is low and the outward extending of the bumpers 41 and 41' is not necessarily required, because the impact resulting from a collision would not be so tremendous.

Figure 1A:
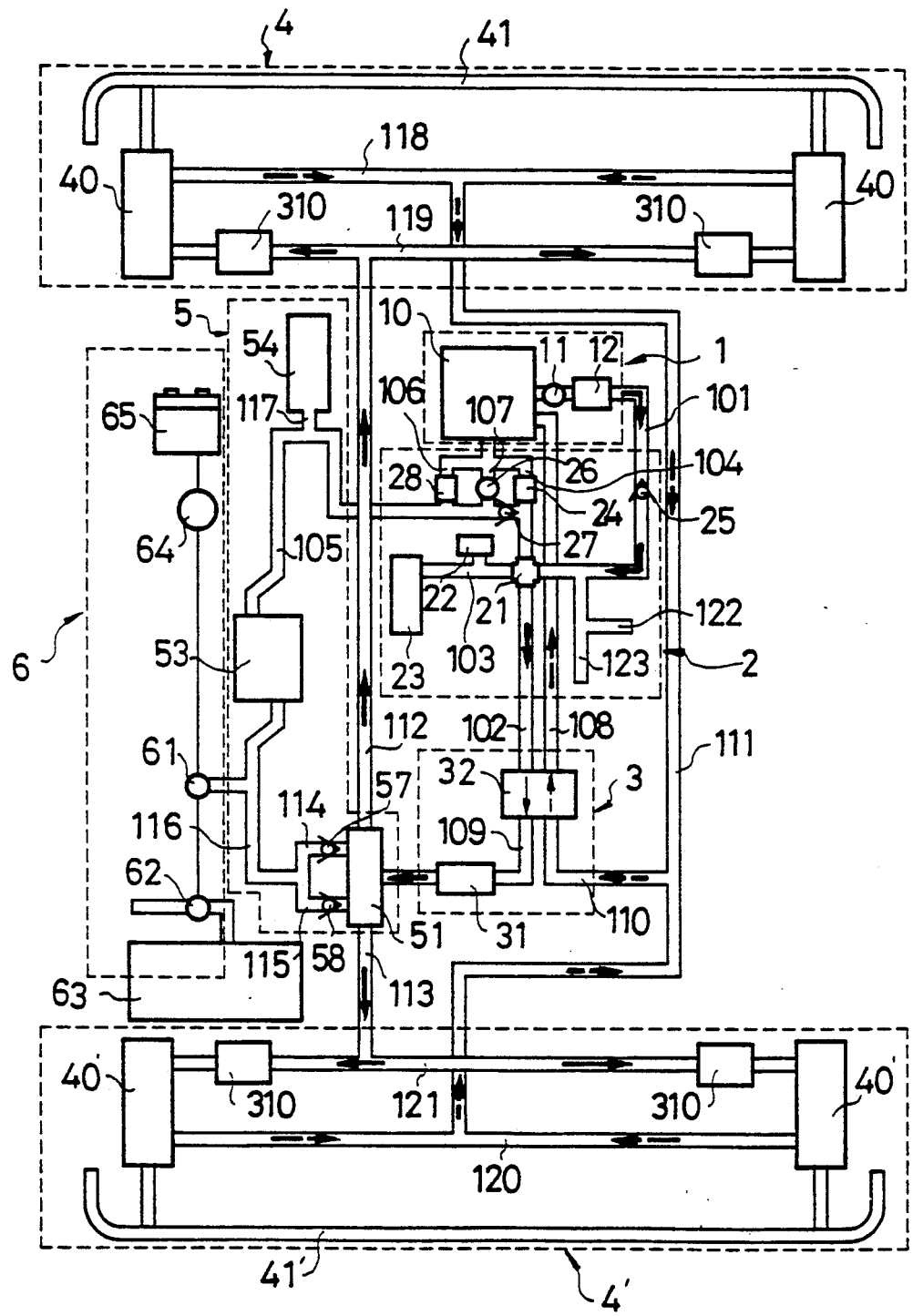
FIG. 1A is a schematic view of the shock-absorbing bumper system in accordance with the present invention, in which front and rear bumpers of a vehicle extend outward due to a depression of a brake pedal of the vehicle before a collision occurs.

Referring now to FIG. 1A, when the brake pedal 202 of the vehicle is depressed before the bumpers are hit, and as illustrated above, the solenoid valve 32 is switched to its first mode (cf. FIG. 4A). Working fluid is pumped from the tank 10 by the pump 12 and flows through the first oil path 101, the cross joint 21, the second oil path 102, the solenoid valve 32, the ninth oil path 109, the limiting valve 31, the shuttle valve 51, and then branches into the twelfth oil path 112 and the thirteenth oil path 113. Working fluid in the twelfth oil path 112 flows into the second chamber 45, pushing the piston 49, together with the piston rod 42, outward. Accordingly, the front bumper 41 moves outward to increase the response space for a possible collision. Similarly, the rear bumper 41' moves outward under the action of working fluid flowing into the thirteenth oil path 113 and the twenty-first oil path 121, as indicated by solid arrows in FIG. 1A.

Working fluid in the first chambers 44 of the first cylinders 40 flows back to the tank 10 via oil paths 118, 111, and 110, the solenoid valve 32, and the eighth oil path 108. Similarly, working fluid in the first chambers of the second cylinders 40' flows back to the tank 10 via oil paths 120, 111, and 110, the solenoid valve 32, and the eighth oil path 108, as indicated by dashed arrows in FIG. 1A.

Figure 1B:
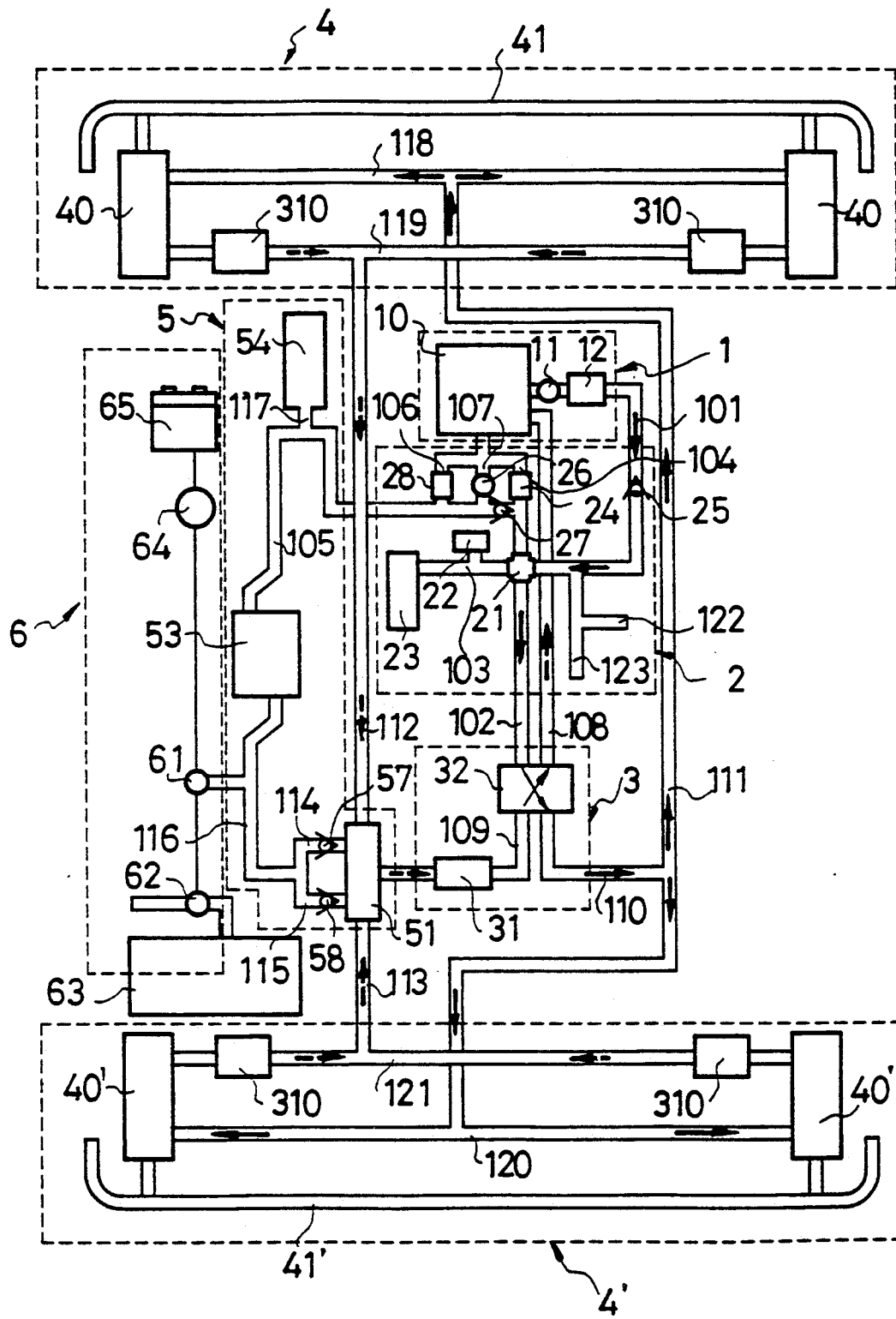
FIG. 1B is a schematic view of the shock-absorbing bumper system in accordance with the present invention, in which no collision occurs and the brake pedal is released.

Referring to FIG. 1B, if the bumpers are not hit, i.e., no collision occurs, the solenoid valve 32 is switched to its second mode (cf. FIG. 4B) as soon as the brake pedal 202 is released. Working fluid is pumped from the tank 10 by the pump 12 and flows through the first oil path 101, the cross joint 21, the second oil path 102, the solenoid valve 32, and the tenth oil path 110. For the front bumper system 4, working fluid enters the first chamber 44 via the eleventh oil path 111 and the eighteenth oil path 118, pushing the piston 49, together with the piston rod 42, inward. Accordingly, the front bumper 41 moves inward to its original unextended position. Similarly, the rear bumper 41' moves inward under the action of working fluid flowing into the first chamber via the eleventh oil path 111 and the twentieth oil path 120, as indicated by solid arrows in FIG. 1B.

Working fluid in the second chambers 45 of the first cylinders 40 flows back to the tank 10 via oil paths 119 and 112, the shuttle valve 51, the ninth oil path 109, the solenoid valve 32, the limiting valve 31, and the eighth oil path 108. Similarly, working fluid in the second chambers of the second cylinders 40' flows back to the tank 10 via oil paths 121 and 113, the shuttle valve 51, the limiting valve 31, the ninth oil path 109, the solenoid valve 32, and the eighth oil path 108, as indicated by dashed arrows in FIG. 1B.

Figure 1C:
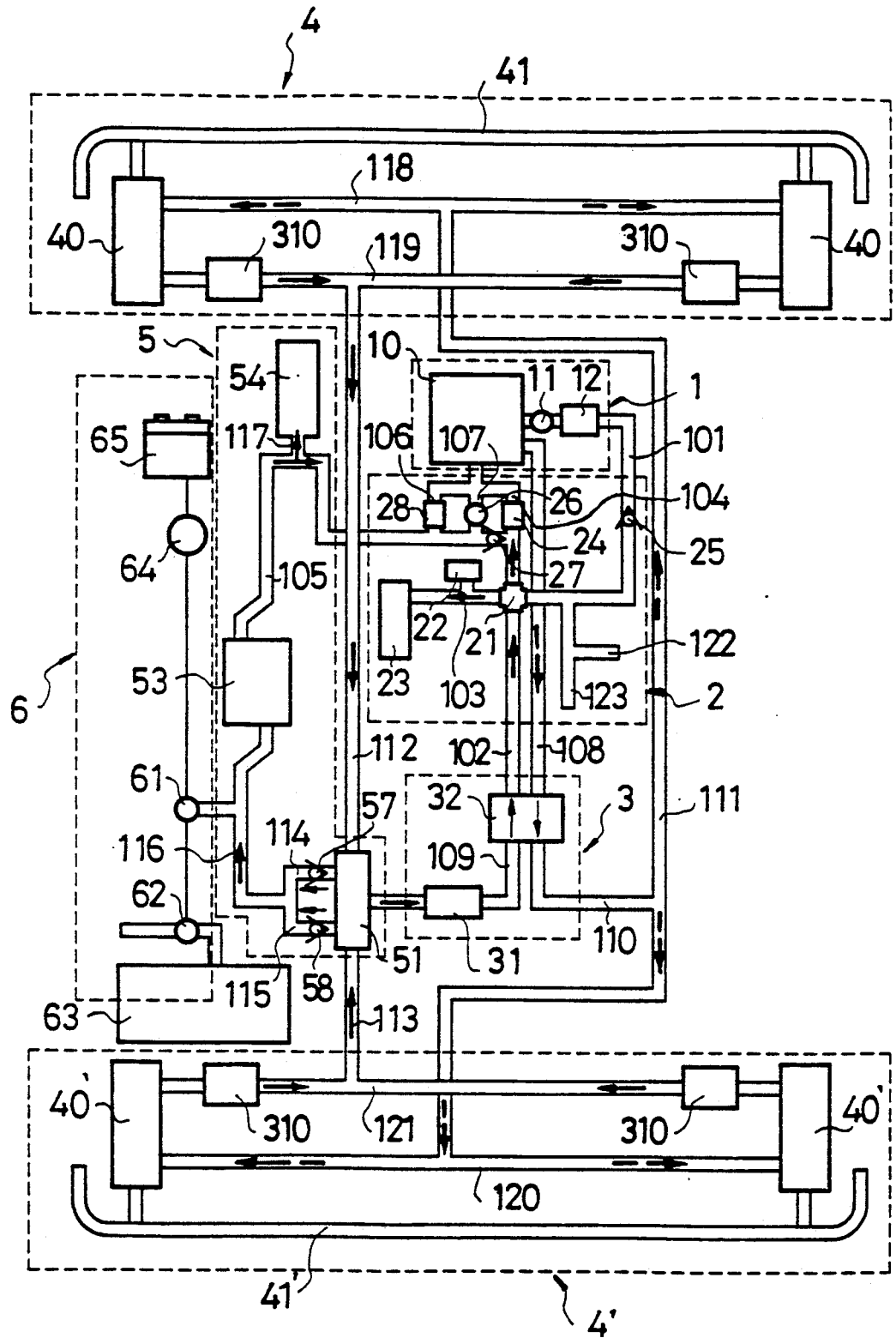
FIG. 1C is a schematic view of the shock-absorbing bumper system in accordance with the present invention, in which brake pedal is depressed and a collision occurs.

Referring to FIG. 1C, when the bumpers are hit, for example, the front bumper 41 is firstly hit (it is rare if the front and rear bumpers 41 and 41' are hit simultaneously), the solenoid valve 32 is switched to its third mode (cf. FIG. 4C), and the shuttle 517 of the shuttle valve 51 is moved downward by working fluid entering the second port 502 via the nineteenth oil path 119 and the twelfth oil path 112.

If the front bumper 41 is slightly hit, as illustrated above, most of the working fluid from the second port 502 flows through the sixteenth oil path 116 to the high-pressure accumulator 54, and the remaining working fluid flows through the ninth oil path 109 to the low-pressure accumulator 23 (because of provision of the limiting valve 31). If the pressure in the twelfth oil path 112, due to the slight collision, increases from 500 psi (the pre-set value of the low-pressure accumulator 23 and the conduit system) to, for example, 700 psi, (but less than 1500 psi, the preset value of the high-pressure accumulator 54), the high-pressure accumulator 54 does not operate, and all of the high pressure of the working fluid is absorbed and stored by the low-pressure accumulator 23 (cf. FIGS. 3 and 3A). (Remember that the buffer 53 absorbs the shock waves.) Accordingly, the impact is absorbed by the low-pressure accumulator 23. Working fluid does not enter the tank 10. Furthermore, as illustrated in the above, the battery 65 and the fuel supply of the vehicle are disconnected during impact (if the impact reaches a pre-determined level). For this, the driver must first relieve excessive pressure in the conduits by the electric pressure relief valve 26 before he starts the vehicle again, (no matter if the pressure relief valves 28 and 24 malfunction or not), providing security protection for the passengers. This is because if the pressure relief valves 28 and 24 malfunction and the excessive pressure is not released before running the vehicle again, the conduits have the possibility of breaking should another accident occur (due to extremely high pressure).

If the bumper 41 is subjected to tremendous impact, most of the working fluid still flows to the sixteenth oil path 116 via the fourth port 504 and the fourteenth oil path 114. The remaining working fluid flows to the ninth oil path 109 via the first port 501, passing through the solenoid valve 32, the cross joint 21, and the fourth oil path 104 as well as the third oil path 103. If the pressure in the second oil path 102, due to the tremendous collision, increases from 500 psi to, for example, 1700 psi, (greater than 1500 psi), the high-pressure accumulator 54 operates to absorb most of the impact energy, and the remaining impact energy is absorbed by the low-pressure accumulator 23 (cf. FIGS. 3 and 3A). If the pressure of the working fluid in the fourth oil path 104 is too high, the pressure relief valve 24 opens, allowing working fluid to enter the tank 10, thereby releasing excessive pressure.

In both conditions (slight and tremendous collisions), the buffer 53 absorbs shock waves resulting from the impact. However, the abruptly increased pressure of working fluid is absorbed by the high-pressure and low-pressure accumulators 54 and 23.

Inward movement of the front bumper 41 causes an inward movement of the piston 49. Working fluid in the tank 10 is supplied to the first chamber 44 via the eighth oil path 108, the solenoid valve 32, the tenth oil path 110, the eleventh oil path 111, and the eighteenth oil path 118.

However, if the pressure of the working fluid in the fifth oil path 105, after absorption of shock waves by the buffer 53 and lowering of pressure by the high-pressure accumulator 54, is still too high, the pressure relief valve 28 opens, allowing working fluid to enter the tank, thereby releasing excessive pressure. If the pressure relief valve 28 malfunctions, the electric pressure relief valve 26 can be used as a back-up pressure relief valve, releasing excessive pressure. In addition, if maintenance is required, a technician may release the pressure in the conduits by the electric pressure relief valve 28, avoiding personal injury caused by pressurized working fluid sprayed from the conduits during detachment thereof.

Subsequently, if the rear bumper 41' is also hit, the solenoid valve 32 is also switched to its third mode (cf. FIG. 4C), and the shuttle 517 of the solenoid valve 32 is moved upward by working fluid entering the second port 503 via the twenty-first oil path 121 and the thirteenth oil path 113.

If the rear bumper 41' is slightly hit, most of the working fluid flows to the sixteenth oil path 116 via the fifth port 505 and the fifteenth oil path 115. Then, working fluid passes through the buffer 53 to the high-pressure accumulator 54, as illustrated in the above. The remaining working fluid flows to the limiting valve 31 and the ninth oil path 109 via the first port 501, passing through the solenoid valve 32, the cross joint 21, and the fourth oil path 104 as well as the third oil path 103. As illustrated above, if the pressure in the twelfth oil path 112 increases to be above 500 psi but less than 1500 psi, all of the abruptly increased pressure of the working fluid is absorbed by the low-pressure accumulator 23.

If the rear bumper 41' is subjected to tremendous impact (the pressure in the twelfth oil path 112 increases to be above 1500 psi), most of working fluid flows to the sixteenth oil path via the fifth port 505 and the fifteenth oil path 115, which subsequently flows into the tank 10. Operation of the buffer 53 and the high-pressure accumulator 54 are the same as that illustrated in the above. The remaining working fluid flows to the ninth oil path 109 via the first port 501, passing through the solenoid valve 32, the cross joint 21, and the fourth oil path 104, as well as the low-pressure accumulator 23. Operation of the low-pressure accumulator 23 and the pressure rrelief valve 24 are the same as that illustrated in the front bumper subsystem 4.

In brief, if the pressure in the twelfth oil path 112 increases to be above the pre-set value of the low-pressure accumulator 23 but lower than the pre-set value of the high-pressure accumulator 54, all of the impact is absorbed by the low-pressure accumulator 23. If the pressure in the twelfth oil path 112 increases to be above the pre-set value of the high-pressure accumulator 54, most part of the impact is absorbed by the high-pressure accumulator 54 and the remaining impact is absorbed by the low-pressure accumulator 23.

Inward movement of the rear bumper 41' causes an inward movement of the piston of the second cylinders 40'. Working fluid in the tank 10 is supplied to the first chambers of the second cylinders 40' via the eighth oil path 108, the solenoid valve 32, the eleventh oil path 111, and the twentieth oil path 120.

In the above embodiment, operation of the shock-absorbing bumper system is illustrated in a manner that the brake pedal of the vehicle is depressed. Nevertheless, the shock-absorbing system still works even though the driver does not depress the brake pedal.

Figure 1D:
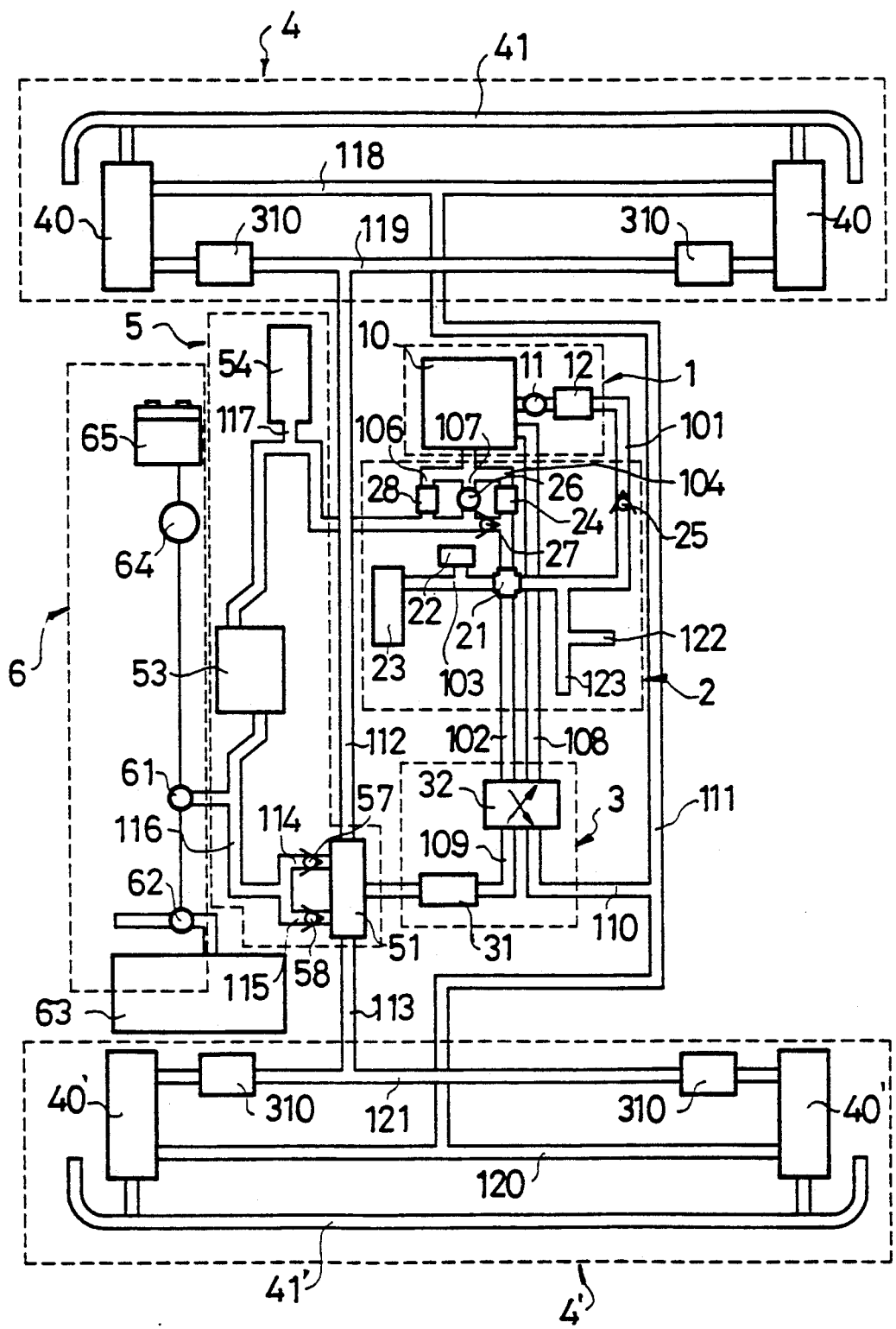
FIG. 1D is a schematic view of the shock-absorbing bumper system in accordance with the present invention, in which the brake pedal is not depressed and a collision occurs, and a solenoid of the bumper system is in a second mode.

Referring to FIG. 1D, the solenoid valve 32 is initially in the second mode (cf. FIG. 4B) since the brake pedal 202 is not depressed. If the front bumper 41 is hit, most of the working fluid flows to the sixteenth oil path 116 via the fourteenth oil path 114 as illustrated above, and the remaining working fluid flows to the oil tank 10 via the ninth oil path 109, the solenoid valve 32, and the eighth oil path 108, as indicated by solid arrows in FIG. 1e. Working fluid in the oil tank 10 is pumped by the pump 12, flowing to the second chambers 45 via the first oil path 101, the cross joint 21, the second oil path 102, the solenoid 32, the tenth oil path 110, the eleventh oil path 111, and the eighteenth oil path 118, as indicated by phantom arrows in FIG. 1E.

Figure 1E:
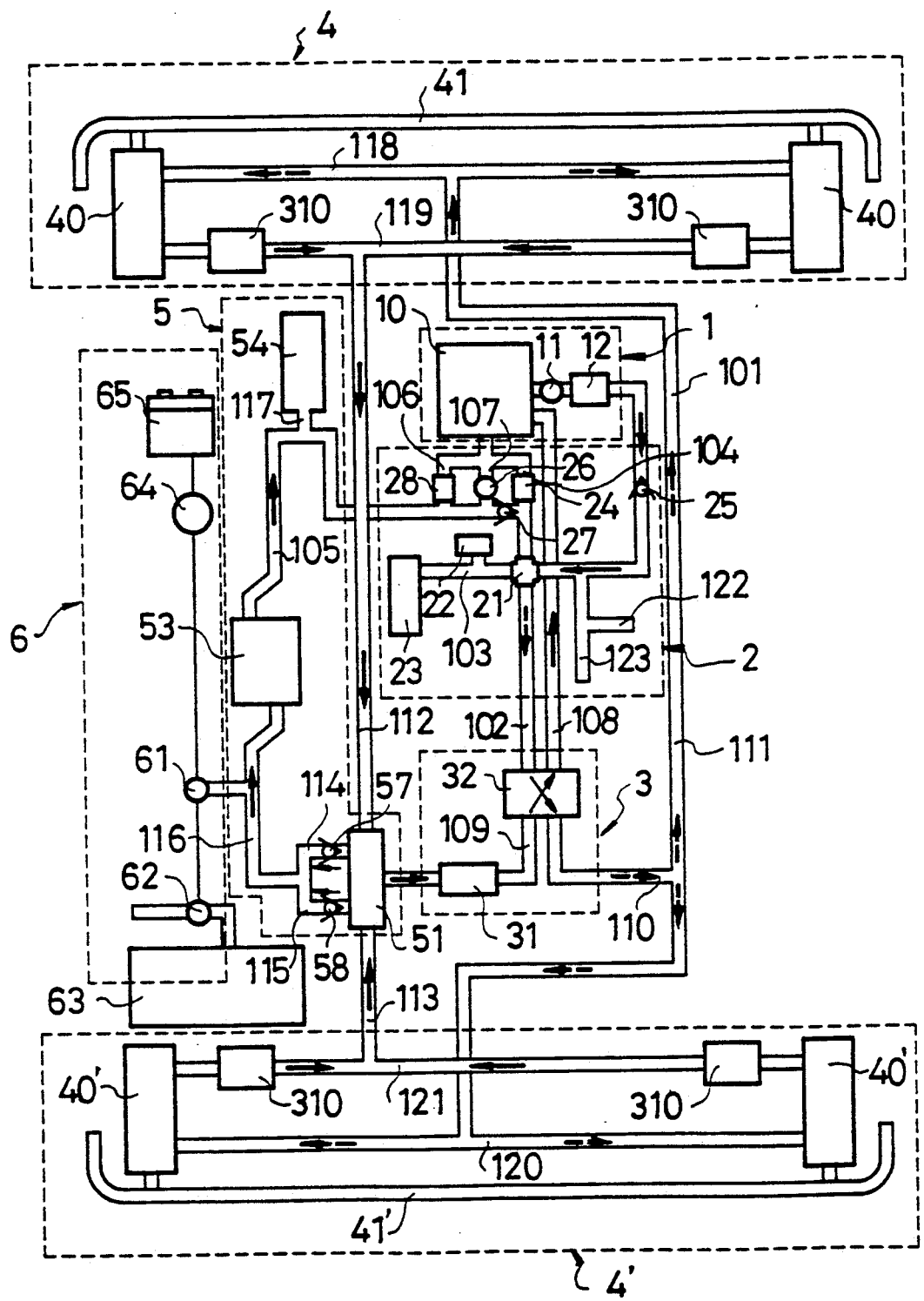
FIG. 1E is a schematic view of the shock-absorbing bumper system in accordance with the present invention, in which the brake pedal is not depressed and a collision occurs.

Similarly, if the front bumper 41 is hit, most of the working fluid flows to the sixteenth oil path 116 via the fifteenth oil path 115 as illustrated above, and the remaining working fluid flows to the oil tank 10 via the ninth oil path 109, the solenoid valve 32, and the eighth oil path 108, as indicated by solid arrows in FIG. 1E. Working fluid in the oil tank 10 is pumped by the pump 12. flowing to the second chambers 45 via the first oil path 101, the cross joint 21, the second oil path 102, the solenoid 32, the tenth oil path 110, the eleventh oil path 111, and the eighteenth oil path 118, as indicated by phantom arrows in FIG. 1E. Function and operation of the high-pressure and low-pressure accumulators 54 and 23 are the same of that set forth in the above, except that the bumpers are not in an extended (collision) position (since the front and rear bumpers have not been extended outward).

Figure 1F:
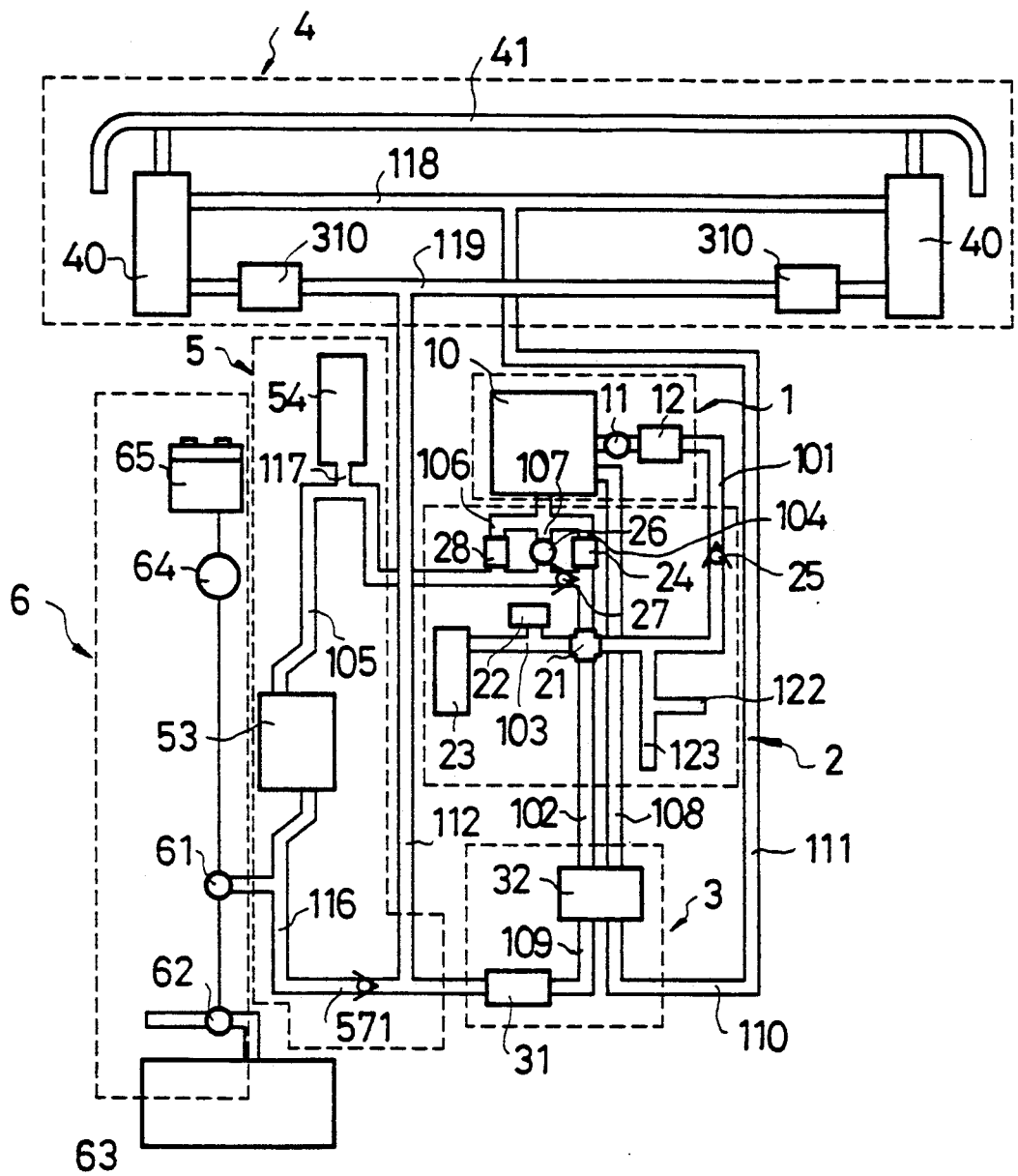
FIG. 1F is a schematic view of an alternative design of the shock-absorbing bumper system in accordance with the present invention, in which only one bumper is equipped with the shock-absorbing bumper system.

FIG. 1F shows an alternative design of the present shock-absorbing bumper system. As can be seen in this figure, only one bumper is equipped with the cylinders and oil paths according to the present invention. The twelfth oil path 112, the sixteenth oil path 116, and the ninth oil path 109 meet at one point. The shuttle valve 51, the fourteenth oil path 114, and the fifteenth oil path 115 are omitted. Only one check valve 571 is provided on the sixteenth oil path 116. In addition, the eleventh oil path 111 directly communicates with the tenth oil path 110. However, operation of the system is substantially the same as that of the above-described system having both front and rear bumper subsystems.

While the present invention has been explained in relation to its preferred embodiment, it is to be understood that various modifications thereof will be apparent top those skilled in the art upon reading this specification. For example, the accumulator may be of a gas pocket type. In addition, a twenty-second oil path 122 can be provided to connect the first oil path 101 and a steering system of the vehicle, providing assistance in steering. The energy source comes from the low-pressure accumulator 23 which absorbs the impact energy due to collision. Furthermore, a twenty-third oil path 123 can be provided to connect the first oil path 101 and a brake system of the vehicle, providing assistance in braking. Similarly, the energy source comes from the low-pressure accumulator 23. It is further noted that the energy stored in the low-pressure accumulator 23 can be utilized to provide assistance in immediately pushing the front and rear bumpers 41 and 41' outward after the brake pedal is depressed under emergency conditions. Therefore, it is to be understood that the invention disclosed herein is intended to cover all such modifications that fall within the scope of the appended claims.

I claim:
1. A shock-absorbing bumper system for an automotive vehicle having a chassis, a front bumper, a rear bumper, and a brake pedal, comprising:
an electrical subsystem actuatable by the brake pedal;
a conduit subsystem for conducting hydraulic fluid therein;
a supply subsystem for supplying hydraulic fluid to said conduit subsystem, including a storage tank for accommodating a supply of hydraulic fluid and a pump for pumping hydraulic fluid from the storage tank to said shock-absorbing system;
a front bumper control subsystem comprising at least one first cylinder with a first piston slidably received therein defining a first inner chamber and a first outer chamber, said first cylinder being fixed to the chassis and said first piston being fixed to the front bumper, said front bumper control subsystem transforming a collision, of the front bumper with an object, into an increase in pressure of the hydraulic fluid;
a rear bumper control subsystem comprising at least one second cylinder with a second piston slidably received therein defining a second inner chamber and a second outer chamber, said second cylinder being fixed to the chassis and said second piston being fixed to the rear bumper, said rear bumper control subsystem transforming a collision, of the rear bumper with an object, into an increase in pressure of the hydraulic fluid;

a feedback subsystem in fluid communication with a pressure-balancing subsystem, a switching subsystem, and said front and rear bumper control subsystems, including:
- a first accumulator provided upstream from said pressure-balancing subsystem for absorbing pressure of the hydraulic fluid greater than a first predetermined value, resulting from a collision of either bumper or both and the object, and
- a shuttle valve provided upstream from said first accumulator and being in fluid communication with said front and rear bumper control subsystems and said switching subsystem for directing working fluid therebetween:

said pressure-balancing subsystem being in fluid communication with said supply subsystem, said switching subsystem, and said feedback subsystem, including a second accumulator for absorbing pressure of the hydraulic fluid greater than a second predetermined value and less than said first predetermined value resulting from said collision of either bumper or both with an object: and said switching subsystem being in fluid communication with said pressure-balancing subsystem, said shuttle valve of said feedback subsystem, and said front and rear bumper control subsystems, including a solenoid valve controllable by the brake pedal via the electrical subsystem and responsive to an inward movement of either the front or the rear bumper resulting from the collision for directing hydraulic fluid to and from said pressure-balancing subsystem, said supply subsystem, said shuttle valve, and said front and rear bumper control subsystems.

2. The shock-absorbing bumper system as claimed in claim 1, wherein said solenoid valve is switched from a second mode to a first mode when the brake pedal is depressed before the collision occurs, in which hydraulic fluid in the storage tank flows through said solenoid valve and said shuttle valve to said first and second inner chambers of said front and rear bumper control subsystems, while the hydraulic fluid in said first and second outer chambers of said front and rear bumper control subsystems flows through said solenoid valve into the storage tank, moving the front and the rear bumper outward to increase a response distance before the collision;

said solenoid being switched from the first mode to a third mode when either of the extended front or rear bumpers moves inward due to the collision, in which hydraulic fluid in said first and second inner chambers of said front and rear bumper control subsystems flows through said shuttle valve and branches into two lines; one line flows to said pressure-balancing subsystem via said first accumulator and the other line flows to said pressure-balancing subsystem via said solenoid valve and said second accumulator; and said solenoid valve being switched from the first mode to the second mode when the depressed brake pedal is released resulting from no collision occurring, in which hydraulic fluid in said storage tank flows to said first and second outer chambers of said front and rear bumper control subsystems via said solenoid valve, and hydraulic fluid in said first and second inner chambers of said front and rear bumper control subsystems flows through said shuttle valve and said solenoid valve into said storage tank.

3. The shock-absorbing bumper system as claimed in claim 2, wherein the solenoid is in the second mode when the brake pedal is not depressed, and hydraulic fluid in said first and second inner chambers of said front and rear bumper control subsystems flows through said shuttle valve and said solenoid valve into said storage tank and hydraulic fluid in the storage tank flows through said solenoid to said first and second outer chambers of said front and rear bumper control subsystems during the collision of either of the front or the rear bumper with the object.

4. The shock-absorbing bumper system as claimed in claim 1, wherein said pressure-balancing subsystem further comprises a pressure sensing/controlling means for activating said pump when pressure of the hydraulic fluid is less than a third predetermined value and for deactivating said pump when pressure of the hydraulic fluid is greater than said third predetermined value.

5. The shock-absorbing bumper system as claimed in claim 1, wherein said pressure-balancing subsystem further comprises:
- a low pressure relief valve disposed downstream from said switching subsystem and upstream from said storage tank; and
- a high pressure relief valve disposed downstream from said first accumulator and upstream from said storage tank.

6. The shock-absorbing bumper system as claimed in claim 5, wherein said pressure-balancing subsystem further comprises:
- an electric relief valve disposed downstream from said first accumulator and upstream from said storage tank, said electric relief valve serving as a back-up pressure relief valve for releasing pressure greater than a pre-determined value when said high-pressure pressure relief valve malfunctions.

7. The shock-absorbing bumper system as claimed in claim 6, wherein said pressure-balancing subsystem relieves pressure of hydraulic fluid when maintenance is required for avoiding personal injury.

8. The shock-absorbing bumper system as claimed in claim 3, wherein a limiting valve is disposed between said shuttle valve and said solenoid valve for limiting a flow of hydraulic fluid from said shuttle valve to said solenoid valve.

9. The shock-absorbing bumper system as claimed in claim 1, wherein said feedback subsystem comprises a buffer provided between said first accumulator and said shuttle valve for absorbing shock waves of the hydraulic fluid resulting from the collision.

10. The shock-absorbing bumper system as claimed in claim 1, wherein said shuttle valve comprises a housing having a first port communicating with said solenoid valve, a second and third ports repectively communicating with said first and second inner chambers of said front and rear bumper control subsystems, and a fourth and a fifth port communicating with said first accumulator, said shuttle valve further comprising a shuttle having a channel communicating with said first, second, and third ports; said shuttle being slidably received in said housing and urged in a central position therein by springs on ends thereof, so that when the collision occurs, said shuttle directs hydraulic fluid from said first inner chambers of said front bumper control subsystem to said feedback subsystem via said fourth port and to said switching subsystem via said first port; said shuttle directs hydraulic fluid from said second inner chambers of said rear bumper control subsystem to said feedback subsystem via said fifth port and to said switching subsystem via said first port; and said shuttle directs hydraulic fluid from said switching subsystem to said first inner chambers via said second port and to said second inner chamber via said third port.

11. The shock-absorbing bumper system as claimed in claim 10 wherein said shuttle valve further comprises a check valve disposed in said conduit subsystem downstream from each said outlet port for preventing hydraulic fluid from entering said shuttle valve via said fourth and fifth ports.

12. The shock-absorbing bumper system as claimed in claim 1, wherein said front and rear bumper control subsystems each further comprise a spring disposed within said inner chamber of each said housing for returning the corresponding piston to a neutral position and for absorbing shock when the collision occurs.

13. The shock-absorbing bumper system as claimed in claim 1, wherein a spring is provided between each said cylinder and the front and rear bumpers for returning the corresponding piston to a neutral position and for absorbing shock when the collision occurs.

14. The shock-absorbing bumper system as claimed in claim 13, further comprising a corresponding number of sleeves each define a space sized so as to slidably receive each said cylinder and an anchoring means for anchoring an internal end of said cylinder in an external end of said sleeve, said anchoring means being breakable to allow said housing to slide into said space when said piston strikes said internal end of said cylinder resulting from a predetermined impact resulting from the collision.

15. The shock-absorbing bumper system as claimed in claim 14, wherein said anchoring means comprises a hole formed through said external end of said sleeve and said internal end of said cylinder, a lining being received in said hole, and a pin being encased by said lining, said anchoring means being in a perpendicular relationship with said piston.

16. The shock-absorbing bumper system as claimed in claim 15, wherein said pin of said anchoring means has a pair of break points positioned in line with inside walls of said sleeve, said break points having a smaller cross-section than that of said pin, so that said pin breaks at said break points.

17. The shock-absorbing bumper system as claimed in claim 1, further comprising a safety control subsystem for disconnecting a battery of the vehicle when the pressure of the hydraulic fluid is greater than a predetermined value resulting from the collision, thereby reducing the risk of fire in a collision.

18. The shock-absorbing bumper system as claimed in claim 1, further comprising a safety control subsystem for disconnecting a fuel tank of the vehicle when the pressure of the hydraulic fluid is greater than a predetermined level resulting from the collision.

19. The shock-absorbing bumper system as claimed in claim 1, wherein said electrical subsystem further comprises a manual control switch, said solenoid valve being operable by the brake pedal when said manual control switch is in a first position such that the front and rear bumpers extend outward when the brake pedal is depressed; said solenoid valve not being operable by the brake pedal when said manual control switch is in a second position.

20. The shock-absorbing bumper system as claimed in claim 1, wherein said electrical subsystem further comprises a circuit breaker for preventing damage in case of an overload.

21. The shock-absorbing bumper system as claimed in claim 1, wherein energy stored by said second accumulator during absorption of pressure provides assistance in pushing the front and rear bumpers outward when the brake pedal is depressed.

22. The shock-absorbing bumper system as claimed in claim 1, wherein an oil path communicates with said second accumulator at a first end thereof, and a second end of said oil path communicates to a brake system of the vehicle, and energy stored by said second accumulator during absorption of pressure provides assistance in braking.

23. The shock-absorbing bumper system as claimed in claim 1, wherein an oil path communicates with said second accumulator at a first end thereof, and a second end of said oil path communicates to a steering system of the vehicle. and energy stored by said second accumulator during absorption of pressure provides assistance in steering.

* * * * *